Patented Oct. 24, 1939

2,176,882

UNITED STATES PATENT OFFICE 2,176,882

RUBBER COMPOUND AND PROCESS OF MAKING SAME

Charles Harold Fisher, Pittsburgh, Pa., assignor to The Pennsylvania Coal Products Co., Petrolia, Pa., a corporation of Pennsylvania No Drawing. Application January 2, 1936, Serial No. 57,313

9 Claims. (Cl. 18—50)

The present invention relates to a rubber compound and a proces of making the same.

The object of the invention is to provide a rubber compound which is resistant to oxidation and discoloration.

In accordance with the present invention, there is incorporated in the rubber mixture prior to vulcanization, said rubber mixture being technically known as "the rubber compound", a small amount of a mixed alkyl hydroxy spiro-bis-indane, which may be a dihydroxy, tetrahydroxy or hexahydroxy compound. The alkyl radicals may be attached to various carbon atoms.

In one specific form of the invention there is incorporated in the rubber mixture prior to vulcanization a condensation product of poly hydroxy phenols or their alkyl ethers, and preferably their methyl ethers, with a mixed ketone, for example, methyl ethyl ketone or other homologues of acetone. The poly hydroxy phenols are exemplified by catechol, resorcinol, pyrogallol and hydroxy hydroquinone and the alkyl ethers thereof by guaiacol, the latter being the monomethyl ether of catechol.

Similar condensation products may be obtained by allowing phenols to react, under the conditions hereinafter described, with derivatives of divinyl ketone (e. g., homologues of phorone,

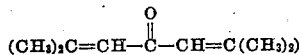

$(CH_3)_2C=CH-\overset{O}{\underset{\|}{C}}-CH=C(CH_3)_2$ or with a mixture of an $\alpha$, $\beta$ unsaturated ketone, exemplified by mesityl oxide, and another ketone such as acetone or methyl ethyl ketone.

The condensation in each case results in the formation of a mixed alkyl hydroxy spiro-bis-indane, and more particularly an alkyl hydroxy spiro-bis-indane having present two different alkyl groups, as exemplified by the methyl and ethyl groups or the equivalent groups.

The following is an illustrative example of a method of preparing the mixed alkyl hydroxy spiro-bis-indane.

A batch comprising the following materials in the quantities set forth is introduced into a refluxing vessel:

Catechol or equivalent amounts of guaiacol, resorcinol, pyrogallol or hydroxyhydroquinone (or its triacetate) _____gm__ 106
Methyl ethyl ketone or an equivalent quantity of an acetone homologue_____cc__ 96
Glacial acetic acid_____cc__ 189
Hydrochloric acid 32%_____cc__ 250
Water _____cc__ 130

In the above example, the hydrochloric acid is stated to have a concentration of 32%. The hydrochloric acid used may have a concentration somewhat higher approximating 35%, which is usually considered concentrated hydrochloric acid.

A batch of the above materials is refluxed for a period of from eighteen (18) to twenty-four (24) hours, or the batch may be allowed to stand in the cold or warmed in a steam bath for a longer period. By the above procedure, the condensations are allowed to occur, and the products of reaction separated from the solution. The solid reaction products are filtered from the mixture and the filtrate is again charged with new quantities of—

Catechol or equivalent amounts of guaiacol, resorcinol, pyrogallol, or hydroxyhydroquinone (or its triacetate) _____gm__ 106
Methyl ethyl ketone_____cc__ 95 and the condensation reactions are repeated. To the liquors from these condensations additional raw materials, as above, are again added with an addition of 32% hydrochloric acid, about 50 cc. of the acid being added for about approximately 600 cc. of the filtrate. This procedure is repeated for 10 cycles, and preferably in every other cycle an addition of a suitable amount of hydrochloric acid is made and in the example given it is desirable to add in about every other cycle 50 cc. of 32% hydrochloric acid for every 600 cc. of the filtrate. After ten (10) runs, the liquors are very much contaminated with by-products and, therefore, are discarded, or they may be treated to recover by known methods the acetic acid present, and the ketone condensation products (such as homologues of mesityl oxide and of phorone) present.

One of the features of the above process of condensation is the production of the condensation product in a reaction medium wherein the liquors from the condensation reaction, after separation of the condensation products, are reused as a medium for further condensation reactions, upon fresh additions of the reacting constituents, such as a phenol and a ketone. While preferably the condensation is carried out in an acid medium comprising a strong inorganic acid and a weak organic acid, other solvent mediums may be employed. It is desirable, although not absolutely necessary, to add an additional strong acid after several cycles of condensation. As stated above, it is preferred to add the strong mineral acid, such as hydrochloric acid, every other cycle, although obviously this will be governed somewhat by the character of the initial starting reaction medium. Tests can be made as to the strength of the acetic acid-hydrochloric acid condensation medium, and it may be brought up to strength as is necessary, whether this be every other cycle, or every third cycle, or otherwise.

In the above example, it has been stated that the condensation liquor is used as a medium for further condensation, but that after ten (10) runs the liquor is discarded, as it is contaminated with by-products. Here again, the figure of ten (10) runs is given as illustrative and this may be considerably varied. Tests will show when the condensation liquid should be discarded.

The batch given above is illustrative of suitable batches. It is highly desirable to keep the ratio of the poly hydroxy phenol or its alkyl ether to the ketone approximately as above specified, as any substantial change in the ratio produces a lower yield or a loss of ketone. The acetic acid or any other suitable medium, examples of which are hereinafter given, must be present in a relatively large proportion to act as a solvent for the by-products which are tarry and must necessarily be kept in solution. It is also desirable to keep the hydrochloric acid concentration, or other condensing agents used, as hereinafter specified, substantially constant, or nearly so. The function of the water present is to dilute the strength of the acids or other reaction medium. It was found that when in the first cycle the amount of water specified was used, that the yield on the first cycle was greatly increased. This is a very important point relative to obtaining a good yield.

While the use of acetic and hydrochloric acids, as given in the above example, are most satisfactory, condensation can be effected by using other condensation mediums. For example, the acetic acid may be eliminated and the reaction product later purified by washing in acetic acid or alcohol. Other solvents besides acetic acid may be used. Sulphuric acid or aluminum chloride may replace the hydrochloric acid, or the hydrochloric acid may be generated "in situ" by a mixture of salt and sulphuric acid.

It is desired to point out that the reuse of liquors in the cycle process disclosed results in a saving of acetic acid. Further, it is highly desirable to use the cyclic process and to reuse the liquors, since the recovery of the acetic acid from the liquors proved to be exceedingly difficult and, further, the reuse of the liquors reduces the cost of the hydrochloric acid consumed in the process. Additionally, the yield is greater because of the unconverted phenol, such as catechol or similar compound, which is always present remaining constant throughout all ten (10) cycles. The use of a plurality of cycles has the advantage that all the catechol added after the first cycle enters into the condensation reaction.

In general, it may be stated that the process of preparing the above or similar phenol ketone condensation products, is flexible, and is not in any feature limited to the conditions set forth. As stated, the same products may be obtained by omitting the acetic acid from the batch, by using other quantities of the reagents by substituting other solvents for the acetic acid, or by using other well known condensing agents in place of hydrochloric acid, as for example, sulphuric acid, aluminum chloride, and a mixture of salt and sulphuric acid, and the like.

The above process introduces economies in operation and results in relatively high yields.

The compounds produced by the above procedure are designated in accordance with the nomenclature system of "Chemical Abstracts" of the American Chemical Society, and have structures similar to that of the catechol, methyl ethyl ketone condensation product, the structure of which is:

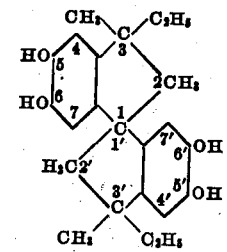

or at least such structural concepts are warranted by the evidence now had.

According to approved nomenclature, this compound may be designated as a "tetrahydroxy derivative of alkyl spiro-bis-indane, or more specifically:

2, 3, 3' -trimethyl-3, 3'-diethyl, -5, 6, 5', 6'-tetrahydroxy 1, 1' spiro-bis-indane, 2, 3, 3' -trimethyl-3, 3' -dimethyl-5, 6, 5', 6'-tetrahydroxy bis 1, 1' spiro-hydrindene.

The tetrahydroxy derivatives of alkyl spiro-bis-indane produced by reacting a poly hydroxy phenol or its alkyl ether with a mixed ketone, such as methyl ethyl ketone, are in general white or light-colored solids melting usually at high temperatures. The products are soluble in acetone, and moderately soluble in alcohol and chloroform, and slightly soluble in gasoline and the like.

The condensation of phenols with ketones having molecular weights greater than acetone produces spiro-bis-indane compounds having larger or heavier alkyl groups than the methyl group which would be present if the condensation had been effected with acetone. It has been found, in general, that the spiro-bis-indane compounds containing larger or heavier alkyl groups have increased solubility in organic materials such as rubber, and are less soluble in water, thus lessening the tendency of the spiro-bis-indane to be removed by water. The increased solubility of the spiro-bis-indane compounds produced by condensation of ketones with phenols having molecular weights greater than acetone produces a more complete mixing of the rubber in a shorter time. The increased solubility of the so-produced spiro-bis-indanes may be very advantageous relative to some types of rubber compounds and less advantageous as to other types of compounds.

The condensation product of catechol with methyl ethyl ketone has a melting point varying between 300–305° C.

The mixed alkyl spiro-bis-indane compound produced by the above method or by any other method may be incorporated in a small amount in a rubber compound, such rubber compound including the usual fillers, vulcanizing agents and accelerators. The method of incorporating the new anti-oxidant and color stabilizer is as follows:

A rubber compound is made up in the usual manner well known in the art, and illustratively may consist of the following materials:

| | Parts by weight |
|---|---|
| Pale crepe rubber | 50 |
| Zinc oxide | 25 |
| Sulphur | 1½ |
| Diphenyl guanidine | ½ |
| The above mentioned mixed alkyl hydroxy spiro-bis-indane | 1 |

The compound may be vulcanized by any of the known methods. The amount of the hydroxy mixed alkyl spiro-bis-indane compound added to the rubber mix may vary within a considerable range, depending on the character of the materials treated, the amount of materials present, and various other conditions. While the one part specified is in most cases the upper limit required as a general observation, the amount of mixed alkyl hydroxy spiro-bis-indane which may be added varies between 0.1 and 5 per cent, based on the weight of the crepe rubber. The above limits are merely illustrative and are not to be considered strictly as being a limitation upon the invention. Broadly, the compounds should be added in every case in an amount sufficient to prevent oxidation and/or discoloration of the vulcanized rubber.

The hydroxy mixed alkyl spiro-bis-indane may be incorporated in all kinds of rubber and rubber compounds and a wide variety of fillers, vulcanizing agents, accelerators and the like may be used. In other words, the prior art may be fully followed in compounding the rubber.

Other mixed alkyl hydroxy spiro-bis-indanes which may be incorporated in the rubber to prevent oxidation and discoloration are:

A. 2, 3, 3' trimethyl, 3, 3' diethyl, 6, 7, 6', 7' tetrahydroxy, 1, 1' spiro-bis indane.
B. 2, 3, 3' trimethyl, 3, 3' diethyl, 4, 5, 4', 5' tetrahydroxy, 1, 1' spiro-bis indane.
C. 2, 3, 3' trimethyl, 3, 3' diethyl, 4, 6, 4', 6' tetrahydroxy, 1, 1' spiro-bis indane.
D. 2, 3, 3' trimethyl, 3, 3' diethyl, 5, 7, 5' 7' tetrahydroxy, 1, 1' spiro-bis indane.
E. 2, 3, 3' trimethyl, 3, 3' diethyl, 4, 5, 6, 4', 5', 6' hexahydroxy, 1, 1' spiro-bis indane.
F. 2, 3, 3' trimethyl, 3, 3' diethyl, 5, 6, 7, 5', 6', 7' hexahydroxy, 1, 1' spiro-bis indane.
G. 2, 3, 3' trimethyl, 3, 3' diethyl, 5, 5' dihydroxy, 6, 6' dimethoxy, 1, 1' spiro-bis indane.
H. 2, 3, 3' trimethyl, 3, 3' diethyl, 5, 5' dimethoxy, 6, 6' dihydroxy 1, 1' spiro-bis indane.
I. 2, 3, 3' trimethyl, 3, 3' diethyl, 4, 6, 7, 4' 6', 7' hexahydroxy, 1, 1' spiro-bis indane.
J. 2, 3, 3' trimethyl, 3, 3' diethyl, 4, 5, 7, 4', 5', 7' hexahydroxy, 1, 1' spiro-bis indane.

Compounds numbers A and B are the products resulting from condensing catechol and methyl ethyl ketone; C and D, resorcin and methyl ethyl ketone; E and F, pyrogallol and methyl ethyl ketone; G and H, guaiacol and methyl ethyl ketone; and I and J from condensing hydroxyhydroquinone and methyl ethyl ketone.

During the condensation process, it is possible to form several isomers, and, therefore, the production of two compounds for each condensation has been set forth.

It is to be observed that the compounds may be alkyl tetrahydroxy, hexahydroxy, dihydroxy, spiro-bis-indane, and that some of the compounds besides containing two different alkyl groups, such a methyl and ethyl, or their equivalents, may also contain an alkoxy group, such as the methoxy or its equivalent in place of hydroxy groups.

While it has been found particularly desirable that the mixed alkyl radicals be the methyl and ethyl radicals, other equivalent alkyl radicals may be introduced into the rings, said alkyl radicals being saturated or unsaturated. Substitutions may be made in the alkyl radicals as desired.

When a compound, such as the above, is incorporated in rubber, it acts as an anti-oxidant and reduces discoloration from sunlight to a minimum. The use of these agents as compared with other well known anti-oxidants reduces peaks in the tensile curve, and permits a much more prolonged overcure without seriously affecting the tensile strength and the aged product. Further, when the mixed alkyl hydroxy spiro-bis-indane is incorporated in the rubber, the final product, after vulcanization on sun exposure tests exhibits practically no discoloration. It is to be noted that this is a marked advantage over other known anti-oxidants which in many cases produce marked discoloration when rubber products containing them are exposed to sunlight. The hydroxy spiro-bis-indanes herein referred to are, therefore, of particular value in the manufacture of white or lightly tinted rubber articles.

Usually, only one of the hydroxy spiro-bis-indanes is used, but in some cases it may be found advantageous to employ mixtures of different hydroxy spiro-bis-indanes.

I claim:

1. The process of preventing oxidation and discoloration of rubber comprising incorporating therein a small amount of an alkyl hydroxy spiro-bis-indane having at least two hydroxy groups and different alkyl radicals.

2. The process of preventing oxidation and discoloration of rubber comprising incorporating therein a small amount of an alkyl hydroxy spiro-bis-indane containing ethyl and methyl radicals and having at least two hydroxy groups.

3. The process of preventing oxidation and discoloration of rubber comprising incorporating therein a small quantity of the hydroxy 1, 1' spiro-bis-indane having a plurality of different alkyl radicals attached to each of the 3, 3' carbon atoms and an alkyl radical attached to the carbon atom in the 2 position and having at least two hydroxy groups.

4. The process of preventing oxidation and discoloration of rubber comprising incorporating therein a small quantity of a tetrahydroxy 1, 1' spiro-bis-indane having a plurality of different alkyl radicals attached to each of the 3, 3' carbon atoms and an alkyl radical attached to the carbon atom in the 2 position.

5. The process of preventing oxidation and discoloration of rubber comprising incorporating therein a small quantity of 2, 3, 3' trimethyl, 3, 3' diethyl, 5, 6, 5', 6' tethrahydroxy, 1, 1' spiro-bis-indane.

6. A rubber compound containing a small amount of an alkyl hydroxy spiro-bis-indane having at least two hydroxy groups and different alkyl radicals.

7. A rubber compound having present a small amount of an alkyl hydroxy spiro-bis-indane containing ethyl and methyl radicals and having at least two hydroxy groups.

8. A rubber compound containing a small quantity of a tetrahydroxy 1, 1' spiro-bis-indane having a plurality of different alkyl radicals attached to each of the 3, 3' carbon atoms and an alkyl radical attached to the carbon atom in the 2 position.

9. A rubber compound containing a small quantity of 2, 3, 3' trimethyl, 3, 3' diethyl, 5, 6, 5', 6' tetrahydroxy, 1, 1' spiro-bis-indane.

CHARLES HAROLD FISHER.